United States Patent [19]

Tajiri

[11] Patent Number: 4,654,503
[45] Date of Patent: Mar. 31, 1987

[54] WELDING CURRENT POWER SUPPLY WITH INDUCTIVE CLIPPING

[75] Inventor: Hiromi Tajiri, Hyogo, Japan

[73] Assignee: Mitsubishi Denki Kabushiki Kaisha, Tokyo, Japan

[21] Appl. No.: 759,808

[22] Filed: Jul. 29, 1985

[30] Foreign Application Priority Data

Jul. 28, 1984 [JP] Japan .................. 59-158272

[51] Int. Cl.$^4$ ............................................. B23K 11/24
[52] U.S. Cl. ................................... 219/110; 323/249
[58] Field of Search ............... 219/108, 110; 323/206, 323/208, 209, 248, 249

[56] References Cited

U.S. PATENT DOCUMENTS 2,697,200 12/1954 Ball et al. ......................... 219/108
3,042,786 7/1962 Babcock et al. ................... 219/110

Primary Examiner—Clifford C. Shaw
Attorney, Agent, or Firm—Sughrue, Mion, Zinn, Macpeak and Seas

[57] ABSTRACT

A welding power supply for applying welding current to materials to be welded, particularly, for seam welding operations for thin materials, wherein the power loss of the unit is minimized, a wide range of welding conditions can be accommodated, and the welding quality is improved. The primary winding 7b of a reactor having an iron core is connected between an AC power source 6 and the welding electrodes 3, 4, while the center-tapped secondary winding 7a is connected to a current controlling unit 8. In the current controlling unit, when the welding current starts to exceed a predetermined value, the secondary winding is controlled so that the welding current cannot increase beyond the predetermined value.

3 Claims, 8 Drawing Figures

WELDING CURRENT POWER SUPPLY WITH INDUCTIVE CLIPPING

BACKGROUND OF THE INVENTION

The present invention relates to a welding power supply unit for applying a welding current to materials to be welded to generate Joule heat to weld the materials.

In the case where, as in a seam welding operation, welding current is applied to materials to be welded to generate Joule heat to weld the materials, the amount of Joule heat produced is represented by $I^2Rt$, that is, it is proportional to the square of the welding current. Therefore, in a welding operation with a sinusoidal current of a commercial frequency 50 Hz or 60 Hz, the amount of heat generated varies greatly, with the result that sputtering, expulsion and surface flashing often occur, welded portions crack, and the welding quality is lowered.

In a thin plate welding operation, since the materials to be welded have small thermal capacities, it is considerably difficult to determine suitable welding conditions and to perform material control for the materials to be welded.

If a welding machine having a low load power factor is employed in a seam welding operation carried out with single-phase, square-wave voltage, a welding current having a substantially triangular waveform flows. Therefore, the seam welding operation suffers from difficulties similar to those which have been described above.

In order to eliminate these difficulties, Japanese Laid-Open Patent Application No. 25886/1983 has proposed a welding method in which, when the welding current exceeds a predetermined value, a switching element in a power inverter provided for an AC power source is intermittently operated to obtain a square waveform welding current. However, this conventional technique is disadvantageous in that, as it is necessary to turn on and off the switching element at high speed, the power loss is relatively high and the switching element must be large in capacity. In addition, turning on and off the switching element at high speed increases the reactive power.

SUMMARY OF THE INVENTION

An object of the invention is thus to eliminate the above-described difficulties.

In accordance with the above and other objects, the invention provides a welding power supply unit in which a reactor with an iron core has a primary winding connected between an AC power source and welding electrodes, and, when a welding current exceeds a predetermined value, a current control unit connected to a secondary winding of the reactor controls the current in the secondary winding so that the welding current is reduced to the predetermined value or smaller, whereby the power loss is decreased and the welding quality is improved.

DESCRIPTION OF THE PREFERRED EMBODIMENTS

Figure 1:
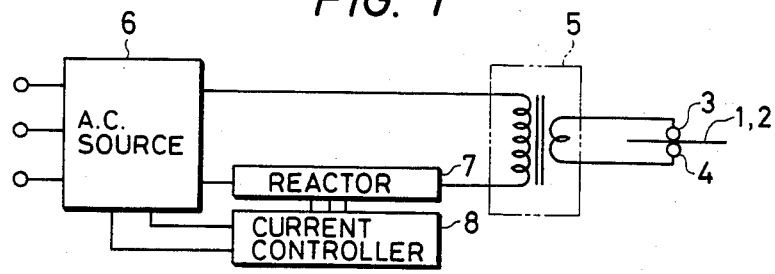
FIG. 1 is a block diagram showing a preferred embodiment of the invention.
Figure 2:
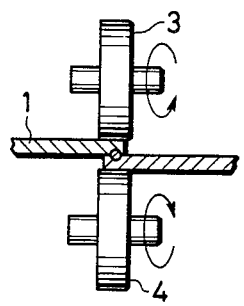
FIG. 2 is a front view showing electrodes employed in the preferred embodiment of the invention.
Figure 3:
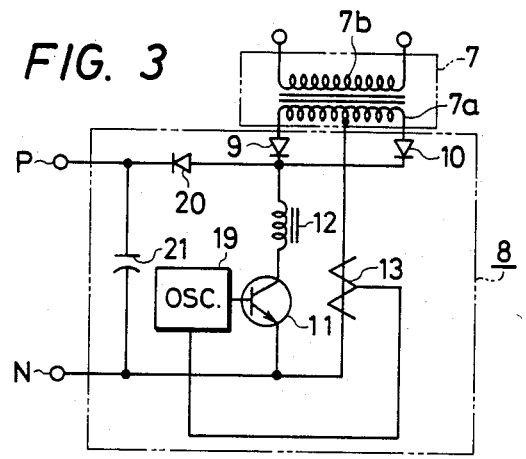
FIG. 3 is a circuit diagram showing a reactor and a current controlling unit in the preferred embodiment of the invention.

FIGS. 1 through 3 show a preferred embodiment of the invention. In these figures, reference numerals 1 and 2 designate plate-shaped members arranged with overlapping edges to be welded together; 3 and 4 are rotatable electrodes for seam welding; 5 is a welding transformer; and 6 is a 600 Hz AC power source including a forward converter (not shown) for converting commercial-frequency, three-phase alternating current to a desired direct current level, and an inverter (not shown) for converting direct current into high frequency current; 7, a reactor with a core which has a secondary winding 7a with a center tap and has a primary winding 7b connected between the welding transformer and the AC power source; and 8, a current controller connected to the secondary winding 7a of the reactor 7. The current controller 8 is designed so that, when the welding current exceeds a predetermined value, the current in the secondary winding 7a is controlled to increase the impedance of the reactor 7, thereby to maintain the welding current less than the predetermined value.

Figure 4:
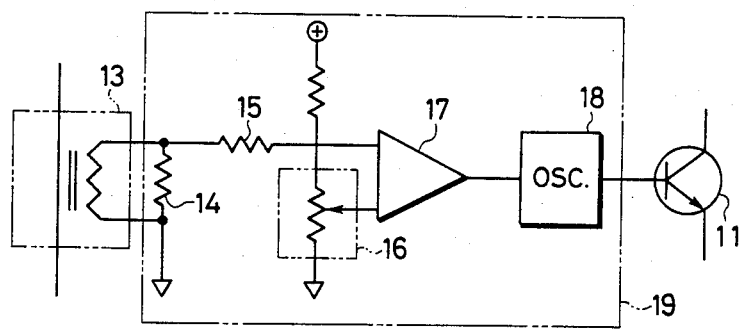
FIG. 4 is a circuit diagram of an oscillating unit in the preferred embodiment of the invention.

FIG. 3 shows the current controller in more detail. In FIGS. 3 and 4, reference numerals 9 and 10 designate diodes for rectifying the current of the secondary winding 7a; 11, a main transistor provided in the circuit in which the direct current outputted by the diodes 9 and 10 flows; 12, a smoothing reactor for smoothing the direct current to smooth the welding current; 13, a current transformer for detecting direct current; 14, a resistor for providing a voltage corresponding to the current detected by the current transformer; 15, a resistor; 16, a current setting unit which outputs a voltage corresponding to a set current value ($I_F$, for instance); 17, an operational amplifier which provides an output when the current value detected by the current transformer is larger than the value set by the current setting unit 16; and 18, an oscillator.

Figure 6:
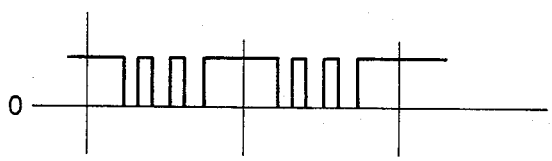
FIG. 6 is a diagram showing the waveform of a base current of a main transistor.

When the operational amplifier 17 provides no output, the oscillator 18 permits base current to flow to the main transistor 11, as shown in FIG. 6, and when the operational amplifier 17 provides outputs, the oscillator 8 oscillates at about 10 KHz to stop the base current, also as shown in FIG. 6. The resistors 14 and 15, the current setting unit 16, the operational amplifier 17, and the oscillator 18 form an oscillating unit 19. In FIG. 3, reference character P designates a positive terminal which is connected to the positive direct current path (not shown) of the AC power source, and N, the negative terminal which is connected to the negative direct current path (not shown) of the AC power source 6. Further in FIG. 3, reference numeral 20 designates a diode, and 21, an electrolytic capacitor.

The operation of the welding power supply unit thus constructed will be described. In a welding operation, the electrodes 3 and 4 are rotated on the plate-shaped members 1 and 2 while pressurizing the latter so that welding current is applied from the AC power source 6 through the welding transformer 5 to the members 1 and 2 to generate Joule heat to weld the members 1 and 2.

Figure 5:
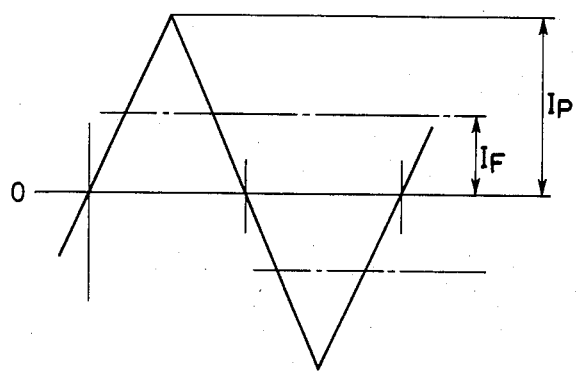
FIG. 5 is a diagram showing a waveform of a conventional welding current.

The output voltage of the AC power source 6 is a square wave. However, in the case where the reactor 7 is eliminated, the inductance of the welding transformer 5, etc., makes the waveform of the welding current triangular as shown in FIG. 5.

In the above-described embodiment of the invention, when the welding current is smaller than the value $I_F$ set by the current setting unit, the operational amplifier provides no output, and therefore the oscillator 18 is not operated. Hence, base current flows continuously in the main transistor 11, as shown in FIG. 6, and the secondary circuit of the reactor 7 is closed. Under this condition, the impedance of the reactor 7 is low and the welding current is not limited.

Figure 7:
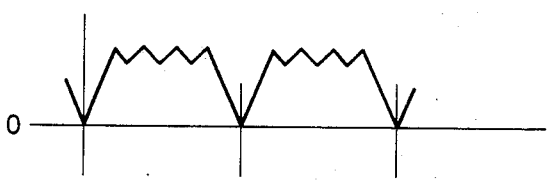
FIG. 7 is a diagram showing the waveform of a direct current in the secondary circuit of the reactor.
Figure 8:
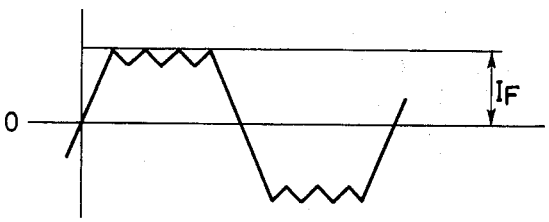
FIG. 8 is a diagram showing the waveform of a welding current in the embodiment of the invention.

When the welding current exceeds the set value $I_F$, the operational amplifier 17 provides an output and the oscillator 18 oscillates to cause base current to flow intermittently, as shown in FIG. 6. In the main transistor 11, the direct current is interrupted intermittently, and therefore the impedance of the primary circuit of the reactor 7 is increased. As a result, the waveform of the current at the output terminals of the diodes 9 and 10 is as shown in FIG. 7, and the peak value of the welding current flowing in the welding transformer 5 is set to the current value $I_F$, as shown in FIG. 8. The top part of the welding current waveform is smoothed by the smoothing reactor 12.

Thus, by controlling the set value $I_F$, the welding current can be controlled to a desired value with the current waveform satisfactorily maintained.

Since the current is controlled with the reactor 7, the power loss is less. The power loss can be further reduced by feeding the secondary current back to the AC power source via the diode 20 and the electrolytic capacitor 21.

If a high frequency power source having a frequency on the order of 600 Hz is employed, then current control can be readily achieved even for materials such as thin plates of a small thermal capacity, with quick response to instantaneous changes in the welding operation.

The invention has been described with reference to a seam welding operation. However, it should be noted that the technical concept of the invention can be effectively applied to other resistance welding operations.

As is apparent from the above description, in the welding power supply unit of the invention, the primary winding of the reactor with an iron core whose secondary winding has a center tap is connected between the AC power source and the welding electrodes, and the secondary winding is connected to the current controlling unit. In the current controlling unit, when the welding current exceeds the predetermined value, the secondary winding is controlled so that the welding current is at the predetermined value or lower. Accordingly, the power loss is minimized, a wide range of welding conditions can be readily obtained, and the welding quality can be improved.

I claim:

1. A welding power supply unit for supplying welding current to generate Joule heat in materials (1, 2) to be welded, to thereby weld said materials, comprising:
   (a) electrodes (3, 4) for applying alternating current to said materials to be welded;
   (b) a welding transformer (5) having a primary winding connected to an AC power source (6) and a secondary winding connected to said electrodes;
   (c) a reactor (7) having a primary winding (7b) connected in series with said primary winding of said welding transformer; and
   (d) current controlling means (8) connected to a secondary winding of said reactor for controlling, when said welding current exceeds a predetermined value, a current in said secondary winding of said reactor to increase the impedance of said reactor and thereby reduce said welding current to said predetermined value or less, wherein said current controlling means comprises:
   (1) sensing means (13) connected to said secondary winding of said reactor for sensing the welding current of said welding transformer; and
   (2) a switching circuit (11, 19) responsive to an output of said sensing means for intermittently interrupting, when said sensed welding current exceeds said predetermined value, the current in said secondary winding of said reactor to thereby increase the impedance of said primary winding of said reactor.

2. The welding power supply unit as claimed in claim 1, wherein said sensing means comprises a current transformer.

3. The welding power supply unit as claimed in claim 2, wherein said switching circuit comprises:
   a switching element (11); and
   an oscillation circuit (19) responsive to an output of said current transformer for controlling an on-off operation of said switching element.

* * * * *